No. 703,884. Patented July 1, 1902.
R. A. YOCHUM.
CUSPIDOR.
(Application filed May 13, 1901.)
(No Model.)
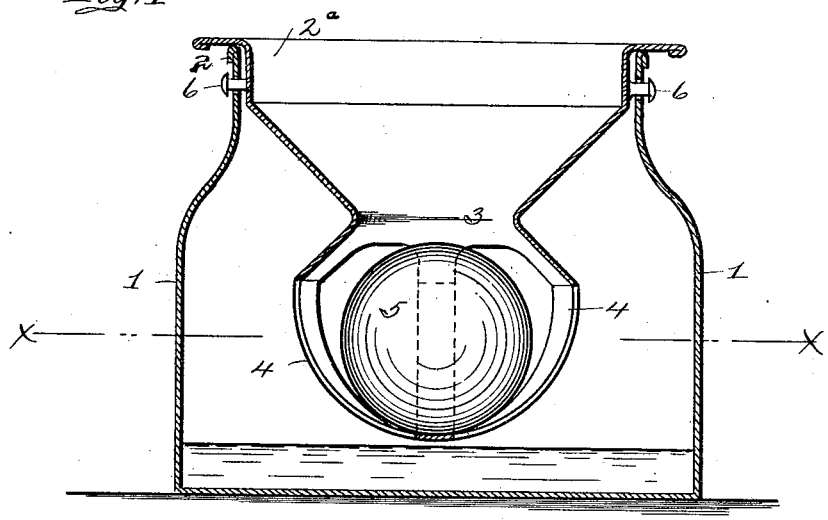
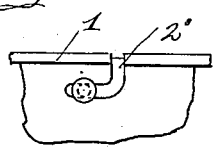
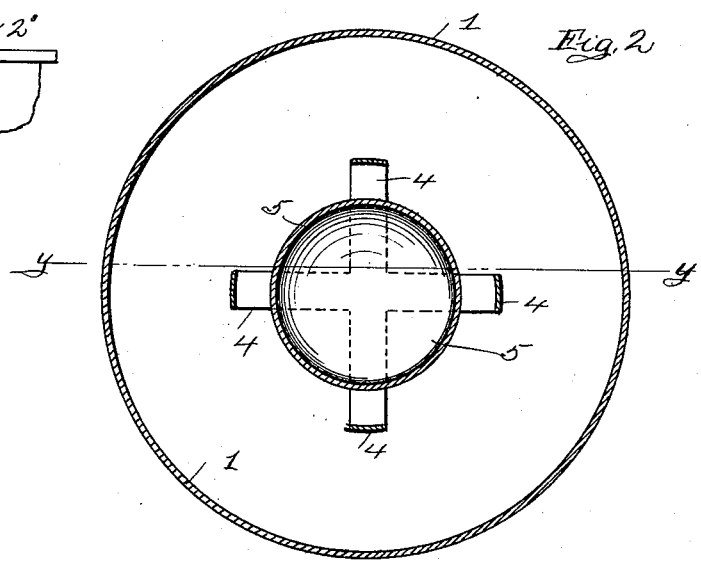
Witnesses:
M. E. Harrison
J. A. Herron
Inventor:
Raymond A. Yochum
By O. D. Levis
Atty.

UNITED STATES PATENT OFFICE.

RAYMOND A. YOCHUM, OF PITTSBURG, PENNSYLVANIA.

CUSPIDOR.

SPECIFICATION forming part of Letters Patent No. 703,884, dated July 1, 1902.

Application filed May 13, 1901. Serial No. 60,016. (No model.)

*To all whom it may concern:*

Be it known that I, RAYMOND A. YOCHUM, a citizen of the United States of America, residing at Pittsburg, in the county of Allegheny and State of Pennsylvania, have invented certain new and useful Improvements in Cuspidors; and I do hereby declare the following to be a full, clear, and exact description thereof, reference being had to the accompanying drawings, which form a part of this specification.

This invention relates to certain new and useful improvements in cuspidors, and has for its main object to construct a cuspidor with means to retain the contents of the same within the bowl in case the latter should be accidentally upset.

The invention relates specifically, therefore, to that class of cuspidors known and termed as "non-spillable" cuspidors, which have a valve or like mechanism adapted to close the inlet when the cuspidor is upset, and I aim to construct a cuspidor of this class in which the construction will be extremely simple, strong, durable, and comparatively inexpensive to manufacture.

In describing the invention in detail reference is had to the accompanying drawings, forming a part of this specification, and wherein like numerals of reference indicate like parts throughout the different views, in which—

Figure 1 is a central vertical sectional view of my improved cuspidor. Fig. 2 is a horizontal sectional view taken on the line $xx$ of Fig. 1. Fig. 3 is a detail side elevation of a part of the bowl, showing how the mouthpiece is secured therein.

To put my invention into practice, I provide a bowl 1, which may be made of any suitable material and of any desired form, though preferably constructed with an annular neck portion 2, which is provided on opposite sides in the rim thereof with bayonet-shaped slots 2'. A mouthpiece or funnel member extends downward into the bowl 1 and is provided with an annular flange $2^a$, which rests on the rim of the neck 2. This funnel member has a contracted neck 3 and terminates in a basket 4, in which is placed a spherical-shaped valve 5. The basket comprises a series of strips, which are produced by cutting away portions of the neck or funnel member at the lower end thereof, the strips crossing one another at right angles. The annular neck portion of the funnel member fits within the annular neck of the bowl 1 and on opposite sides carries rivets or headed pins 6, which engage in the bayonet-shaped slots 2' and hold the funnel member within the bowl. The spherical-shaped valve 5 is adapted to be constructed of rubber or like elastic material, so that the same can be compressed to force the same through the neck 3 and into the basket 4. In case the cuspidor is upset it will be observed that this ball-valve 5 will seat against the contracted neck 3 and close the outlet to the contents of the cuspidor, while when the cuspidor is in the upright position the ball-valve will lie in the bottom of the basket, as shown in Fig. 1 of the drawings. The overlying flange $2^a$ projects beyond the neck of the bowl, and thus affords a grip, by means of which the funnel member or mouthpiece may be turned so as to disengage the pins 6 from the bayonet-shaped slots and permit the removal of the neck or funnel member when it is desired to clean the cuspidor.

In the construction of the device it will of course be observed that various changes may be made in the details of construction without departing from the general spirit of the invention.

Having fully described my invention, what I claim as new, and desire to secure by Letters Patent, is—

In a non-spillable spittoon, the combination of a bowl having an integral contracted neck portion with bayonet-shaped slots formed on opposite sides thereof, of a mouthpiece having an outwardly-extended flange for engagement with the end of the contracted neck portion and extending therebeyond, said flange of the mouthpiece carrying an integral right-angular downwardly-extending flange for engagement with the said interior of the contracted neck portion, headed pins carried by said right-angular flange of the mouthpiece and operating in said slots, said mouthpiece carrying a downwardly-extending contracted portion, a pair of outwardly-extending integral strips formed integral with the said contracted portion, said strips having spaces therebetween and being bowed intermediate of their ends to form a semicircular valve-seat, the strips crossing one another at right angles, and a hollow flexible ball-valve in said seat for engagement with said contracted portion of the mouthpiece, substantially as described.

In testimony whereof I have hereunto affixed my signature in the presence of two subscribing witnesses.

RAYMOND A. YOCHUM.

Witnesses:
JOHN GROETZINGER,
M. E. HARRISON.